Jan. 10, 1933.   J. F. FIEG   1,894,034
SCREW HEAD
Filed July 6, 1931
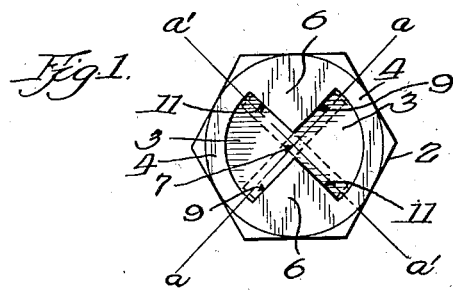
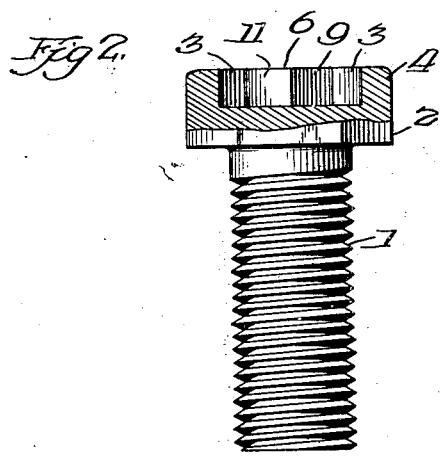
Inventor:
Joseph F. Fieg Patented Jan. 10, 1933

1,894,034

UNITED STATES PATENT OFFICE

JOSEPH F. FIEG, OF LA GRANGE, ILLINOIS, ASSIGNOR TO UNITED SCREW AND BOLT CORPORATION, OF CHICAGO, ILLINOIS, A CORPORATION OF OHIO

SCREW HEAD

Application filed July 6, 1931. Serial No. 548,748.

This invention relates to screws such as wood screws, machine screws, or the like and its purpose is to provide a novel head for a screw whereby the screw may be more readily and securely driven into place equally well with a hand or power driven screw driver or wrench.

As manufactured today screws adapted to be driven with a screw driver are provided with a central slot to receive the end of the screw driver.

The use of slotted head screws requires that the axes of the screw and the screw-driver must be substantially co-incident with the driving faces of the screw driver blade substantially in line with slot to admit proper locating of the screw driver blade in the screw slot. To properly locate a screw driver in the screw slot sometimes proves to be not only a very annoying but also a costly operation; especially if screw head is in an inverted position or in a position otherwise difficult of access. In slotted heads the tendency of the screw driver is to work out of the slot due to the wedging action of the tapered sides of the screw driver against the side walls of the slot. This is particularly true of round head screws. It is further difficult to retain a screw driver within the slot after being located therein since the screw driver not only tends to work outwardly in a direction parallel to the axis of the screw but also laterally in a direction perpendicular to the axis of the screw. Failure to locate, and failure to keep blade in proper engagement frequently results in badly distorted slots which are thereby made useless, or at least far less effective for further use, even with a well-proportioned, well-made screw driver, and not infrequently presents a serious safety hazard.

Furthermore the possible turning effort which may be applied by a screw driver to a slotted round head screw is limited by the character of the head, i. e., due to the fact that the maximum depth of the screw slot in a screw head is at the center of the screw head where the turning effort is least, due to lack of leverage and the minimum depth of the slot is at the marginal edges of the screw head where the turning effort would otherwise be greatest. The above driving engagement conditions are exactly the reverse of ideal. Ideal driving engagement between screw driver and screw head requires maximum engagement between driving and driven elements at points where turning moment is maximum.

With the advent of "line assembly" and other intensive production methods, the difficulties encountered when making screw driver assemblies, and which are inherently associated with the use of slotted head screws, as explained in detail above, have become more noticeable, and also more costly, and have given rise to a demand for improved assembly methods. Efforts to eliminate the difficulties inherent in slotted head assembling methods have brought about a more general use of square head and hexagon head screws, especially in "line assemblies" where power driven box-wrenches can be used to advantage. The use of square or hexagon head screws however has its disadvantages and does not permit using a screw driver.

With the disadvantages of the usual screw heads in mind I have conceived a screw head which will permit the use of a screw driver or wrench and which will provide a more nearly ideal driving connection whereby it is possible to obtain substantially the same turning effort with a screw driver as would be possible with a box wrench which will facilitate locating and retaining a screw driver in the screw head and which will have all the other normal advantages of a screw driver, as will be apparent to those skilled in the art.

In accordance with this invention I provide a screw head having a recess or socket rather than a slot adapted to receive and retain a screw driver blade therein, the recess being provided with tooth-like diametrically opposite projections which closely resemble clutch teeth whereby the screw driver is in a sense connected to the screw head by a clutch-like connection. The teeth are provided with parallel abutment surfaces and are arranged adjacent the perimeter of the head to provide maximum turning effort. The surrounding wall of the recess prevents slipping of the screw driver from the recess. The exterior of the head is preferably made polygonal in shape so that the screw may be turned by a wrench as well as by a screw driver.

A better understanding of my invention will be obtained from the following description given in connection with the drawing, in which:

Fig. 1 is a plan view of a screw head constructed in accordance with this invention and illustrating the possible working positions of a screw driver in dotted lines; and Fig. 2 is a side elevation of a screw, the head being partly broken away to illustrate the interior of the screw driver receiving socket.

My invention will be described in detail as embodied in a machine screw although it will be manifest that the invention is equally applicable to any type of screw and that the disadvantages of the standard slotted type of screw heads as now manufactured are the same in all types of screws.

As can be seen from the drawing, the illustrated screw has a threaded shank 1 and a hexagonal head 2 thereon. Two sector-like recesses 3 are provided in the upper surface of the head, the recesses being of substantial and preferably uniform depth and surrounded by a reinforcing and retaining wall 4. Projecting into the recess from diametrically opposite points along the wall 4 are two tapered tooth-like projections 6 which extend inwardly toward the center of the recess but stop short of the center, leaving a restricted open center 7 between the two sector-like recesses 3. The angles between the side walls of the two projections 6 are equal being preferably substantially ninety degrees (90°). The side walls 9 and 11 of one projection are preferably parallel to corresponding opposite walls 9 and 11 of the other projection, all of which walls intersect the arcuate inner peripheral surface of wall 4. The side walls 9 and 11 are illustrated as being straight, i. e. each wall lies in only one plane, and are each parallel respectively but are spaced from each other approximately the thickness of the proper size screw driver which would be used for the particular size screw head. Obviously, however, the invention is not limited to this particular shape and arrangement of walls.

The recess in the head having the configuration just described is well adapted to readily receive a screw driver with comparatively little effort in permanently locating itself. This feature is particularly advantageous when it is attempted to drive a screw from a position obscure to the operator or when it is attempted to drive the screw with a power driven screw driver. The recess not only provides an easily located receptacle for the screw driver but provides locking clutch-like jaws adjacent the periphery of the head by means of which the screw may be positively driven in a manner similar to a positive clutch. A head of this type also facilitates starting of a screw when it is impossible to hold the screw by hand as a pair of pliers may readily grip the surrounding wall. In the case of a slotted head screw it is very difficult to grip the head with a pair of pliers.

By the foregoing construction either a hand or power operated box wrench, open end wrench or screw driver may be utilized to drive the screw with equal facility.

The advantages offered by the use of a head which combines equal adaptability for use in an assembly line where wrench assembly methods may be preferred, because of existing equipment, with possibilities of having subsequent removal or adjustments of screws in an assembly made, either in manufacturer's plant, on sales-floor, or by the final user, without the aid of line-assembly tools, but with either wrench or screw driver, whichever may be most conveniently at hand, should be quite obvious.

The further consideration that a screw driver, either hand or power operated—the latter to supersede or replace the more expensive box-wrench in the assembly line—may be used with much greater facility and effectiveness and with far less danger of injury to usefulness or appearance of head than would be possible with the use of standard slotted heads; and, when power screw driver is used, with less injury to appearance of head than results from the use of power-driven box-wrench, makes the advantages of such a head still more pronounced.

The provisions of sector-like openings with a substantial length of arc provides a wide opening, allowing the screw driver blade to enter properly with a permissible variation of substantially ninety degrees (90°) in angular alignment of the blade. In other words, the head instead of having the usual slot which necessitates perfect angular alignment of the screw driver blade with the slot before the screw driver may enter is provided with two diametrically opposite clutch teeth, the plane working surfaces of which are parallel to each other but removed laterally from each other a distance equal to the thickness of the proper sized screw driver blade. It is this wide opening, allowing the screw driver blade to enter properly with a substantial variation in angular alignment of the blade that so greatly facilitates entry of the screw driver. This latter feature is of particular importance in line assembly work. The height of teeth is uniform and provides maximum depth of engagement with the screw driver blade at the sides of the blade where turning effort is maximum. It is this driving engagement, similar to that of a tooth clutch or coupling, that gives the screw driver an effectiveness far greater than can be obtained from the use of slotted head screws, especially the popular round head. The segmental walls joining the driving teeth at the periphery of head serve to retain the screw driver in place, to reinforce teeth, and head generally, but are primarily intended to facilitate locating the screw driver in the head of the screw by properly "centering" the blade and keeping it centered and preventing the "side-slip" which is so very objectionable and dangerous in the use of the slotted head screw.

As previously stated the sides of teeth may be and preferably are flat, generally square or rectangular in plan and parallel to axis of screw in one direction and parallel to and located a distance equal to one-half the thickness of a screw driver blade from radial lines a—a and a'—a' in the other direction.

From the viewpoint of material used the clutch drive head of this invention may be made from less material than a square or hexagon head and substantially the same amount of material as a round head but does not have the inherent disadvantages of the round head.

As previously stated it is obvious that the head need not be hexagonal but may be square, round, or of any other desired contour and that the principles of this invention may be applied to other types of screws than machine screws. It is also obvious that other minor changes may be made without departing from the spirit and scope of this invention as defined in the claims appended hereto.

Having described my invention, I claim:

1. A screw comprising a threaded shank and a head thereon, said head having recesses therein surrounded by a wall, said recesses being of substantial and uniform depth and having a pair of tapered teeth therebetween extending from diametrically opposite sides of the head toward the center thereof, the angle between the side walls of the teeth being ninety degrees (90°).

2. A screw comprising a threaded shank and a head thereon, said head having recesses therein of substantial and uniform depth and joined by a restricted center opening of materially less width than the recesses but of sufficient width to receive a screw driver, each of said recesses being defined by an end wall and plane side walls intersecting therewith, pairs of said side walls intersecting with each other, and each side wall of a recess being parallel to a side wall of an opposite recess.

3. A screw comprising a threaded shank and a head thereon, said head having recesses therein of substantial and uniform depth and having a pair of tapered teeth between said recesses extending inwardly from diametrically opposite sides of the head toward the center thereof, each side wall of one tooth being parallel to a side wall of the opposed tooth and being spaced laterally therefrom a distance sufficient to permit the insertion of a screw driver therebetween.

4. A screw comprising a threaded shank and a head thereon having recesses therein of substantial and uniform depth and having a pair of tapered teeth between said recesses and extending inwardly from diametrically opposite sides of the head toward the center thereof, each side wall of one tooth being parallel to a side wall of the opposed tooth and spaced from a diameter across said head and parallel thereto.

In witness of the foregoing I affix my signature.

JOSEPH F. FIEG.